United States Patent
Sasaki et al.

(10) Patent No.: US 10,742,152 B2
(45) Date of Patent: Aug. 11, 2020

(54) MOTOR CONTROL APPARATUS, CONTROL METHOD THEREOF, AND PROGRAM

(71) Applicant: TOYOTA JIDOSHA KABUSHIKI KAISHA, Toyota-shi, Aichi-ken (JP)

(72) Inventors: Yu Sasaki, Toyota (JP); Yuki Nomura, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/372,488

(22) Filed: Apr. 2, 2019

(65) Prior Publication Data

US 2019/0372498 A1 Dec. 5, 2019

(30) Foreign Application Priority Data

May 31, 2018 (JP) .................... 2018-105155

(51) Int. Cl.
 *H02P 21/22* (2016.01)
 *H02P 27/14* (2006.01)
 *H02P 27/08* (2006.01)

(52) U.S. Cl.
 CPC ............ *H02P 21/22* (2016.02); *H02P 27/085* (2013.01); *H02P 27/14* (2013.01)

(58) Field of Classification Search
 CPC .................................. H02P 21/22; H02P 27/14
 USPC ................................ 318/400.02, 400.01, 700
 See application file for complete search history.

(56) References Cited

U.S. PATENT DOCUMENTS 5,463,299 A * 10/1995 Futami ..................... H02P 6/06
 318/400.13

FOREIGN PATENT DOCUMENTS

JP 2008-265645 A 11/2008
JP 2010-148301 A 7/2010

* cited by examiner

*Primary Examiner* — David Luo
(74) *Attorney, Agent, or Firm* — Oliff PLC

(57) ABSTRACT

A motor control apparatus includes an inverter comprising switching elements, current detection means for detecting a phase current value, conversion means for converting the phase current value into a digital AD conversion value, and current control means for controlling a three-phase AC motor by switching the switching elements using a current command value based on the AD conversion value. When the conversion means determines that an amplitude of the current command value is greater than or equal to a threshold, it acquires the phase current value at timings of at least one of $t=\tau/8$, $3\tau/8$ and $t=5\tau/8$, $7\tau/8$ converts the acquired phase current value into the AD conversion value. When the conversion means determines that the amplitude of the current command value is smaller than the threshold, it acquires the phase current value at a timing of $t=\tau/2$, converts the acquired phase current value into the AD conversion value.

7 Claims, 7 Drawing Sheets

MOTOR CONTROL APPARATUS, CONTROL METHOD THEREOF, AND PROGRAM

CROSS REFERENCE TO RELATED APPLICATIONS

This application is based upon and claims the benefit of priority from Japanese patent application No. 2018-105155, filed on May 31, 2018, the disclosure of which is incorporated herein in its entirety by reference.

BACKGROUND

The present disclosure relates to a motor control apparatus for controlling a three-phase AC motor, a control method thereof, and a program.

A motor control apparatus that converts a phase current value of a three-phase AC motor detected by a current sensor into a digital AD conversion value, generates a current command value based on this converted AD conversion value, and switches a switching element of an inverter based on the current command value to control the three-phase AC motor is known (e.g., Japanese Unexamined Patent Application Publication Nos. 2010-148301 and 2008-265645).

The motor control apparatus disclosed in Japanese Unexamined Patent Application Publication No. 2010-148301 corrects the current command value in order to prevent a switching noise of the inverter from occurring. However, the present inventor has found a problem that the correction of the current command value may cause a waveform of the current command value to be distorted, thus adversely affecting the motor control. The present inventor has found another problem that in the motor control apparatus disclosed in Japanese Unexamined Patent Application Publication No. 2008-265645, when a duty ratio changes, the switching noise of the inverter may not be prevented from occurring, and thus the motor control may be adversely affected.

SUMMARY

The present disclosure has been made to solve such a problem. A main object of the present disclosure is to provide a motor control apparatus capable of preventing a switching noise from occurring and highly accurately controlling a motor, a control method thereof, and a program.

An example aspect of the present disclosure to achieve the above object is a motor control apparatus including:

an inverter including a plurality of switching elements configured to be switched on and off;

current detection means for detecting a phase current value output from the inverter to each phase of a three-phase AC motor;

conversion means for converting the phase current value detected by the current detection means into a digital AD conversion value; and current control means for controlling the three-phase AC motor by switching the switching elements of the inverter using a current command value based on the AD conversion value converted by the conversion means.

When the conversion means determines that an amplitude of the current command value is greater than or equal to a threshold, it acquires the phase current value from the current detection means at least one of at timings of $t=\tau/8$ and $3\tau/8$ and at timings of $t=5\tau/8$ and $7\tau/8$, where $\tau$ is one cycle of a PWM signal for controlling the switching elements of the inverter, converts the acquired phase current value into the AD conversion value, and then outputs it, and when the conversion means determines that the amplitude of the current command value is smaller than the threshold, it acquires the phase current value from the current detection means at a timing of $t=\tau/2$, converts the acquired phase current value into the AD conversion value, and then outputs it.

In this example aspect, if the conversion means determines that the amplitude of the current command value is greater or equal to the threshold, when an electrical angle $\theta$ of the three-phase AC motor is $0 \leq \theta < \pi/6$, $3\pi/6 \leq \theta < 5\pi/6$, $7\pi/6 \leq \theta < 9\pi/6$, or $11\pi/6 \leq \theta < 2\pi$, the conversion means may acquire phase current values from the current detection means at timings of $t=\tau/8$ and $7\tau/8$, convert the acquired phase current values into AD conversion values, and then output them, and when the electrical angle $\theta$ of the three-phase AC motor is $\pi/6 \leq \theta < 3\pi/6$, $5\pi/6 \leq \theta < 7\pi/6$, or $9\pi/6 \leq \theta < 11\pi/6$, the conversion means may acquire a phase current value from the current detection means at timings of $t=3\tau/8$ and $5\tau/8$, convert the acquired phase current values into AD conversion values, and then output them.

In this example aspect, when the conversion means determines that the amplitude of the current command value is greater than or equal to the threshold, it may acquire the phase current values from the current detection means at timings of $t=\tau/8$ and $3\tau/8$ and at timings of $t=5\tau/8$ and $7\tau/8$, and convert the acquired phase current values into AD conversion values, the conversion means may calculate an average value of the converted AD conversion value at the timing of the time $t=\tau/8$ and the converted AD conversion value at the timing of $t=7\tau/8$, and output the calculated average value of the AD conversion values, and the conversion means may calculate an average value of the converted AD conversion value at the timing of $t=3\tau/8$ and the converted AD conversion value at the timing of $t=5\tau/8$, and output the calculated average value of the AD conversion values.

In this example aspect, the conversion means converts the phase current values of two phases among the phase current values of three phases from the current detection means into the AD conversion values, and calculates the AD conversion value of a remaining one phase based on a relational expression between the converted AD conversion values of the two phases and the phase current values of the three phases.

Another example aspect of the present disclosure to achieve the above object is a method of controlling a motor control apparatus includes:

an inverter including a plurality of switching elements configured to be switched on and off;

current detection means for detecting a phase current value output from the inverter to each phase of a three-phase AC motor;

conversion means for converting the phase current value detected by the current detection means into a digital AD conversion value; and current control means for controlling the three-phase AC motor by switching the switching elements of the inverter using a current command value based on the AD conversion value converted by the conversion means. The method may include;

when it is determined that an amplitude of the current command value is greater than or equal to a threshold, acquiring the phase current value from the current detection means at least one of at timings of $t=\tau/8$ and $3\tau/8$ and at timings of t=5τ/8 and 7τ/8, where τ is one cycle of a PWM signal for controlling the switching elements of the inverter, converting the acquired phase current value into the AD conversion value, and then outputting it, and when it is determined that the amplitude of the current command value is smaller than the threshold, acquiring the phase current value from the current detection means at a timing of t=τ/2, converting the acquired phase current value into the AD conversion value, and then outputting it.

Another example aspect of the present disclosure to achieve the above object is a program for a motor control apparatus comprising:

an inverter including a plurality of switching elements configured to be switched on and off;

current detection means for detecting a phase current value output from the inverter to each phase of a three-phase AC motor;

conversion means for converting the phase current value detected by the current detection means into a digital AD conversion value; and current control means for controlling the three-phase AC motor by switching the switching elements of the inverter using a current command value based on the AD conversion value converted by the conversion means. The program may cause a computer to execute:

when it is determined that an amplitude of the current command value is greater than or equal to a threshold, acquiring the phase current value from the current detection means at least one of at timings of t=τ/8 and 3τ/8 and at timings of t=5τ/8 and 7τ/8, where τ is one cycle of a PWM signal for controlling the switching elements of the inverter, converting the acquired phase current value into the AD conversion value, and then outputting it, and when it is determined that the amplitude of the current command value is smaller than the threshold, acquiring the phase current value from the current detection means at a timing of t=τ/2, converting the acquired phase current value into the AD conversion value, and then outputting it.

According to the present disclosure, it is possible to provide a motor control apparatus capable of preventing a switching noise from occurring and highly accurately controlling a motor, a control method thereof, and a program.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
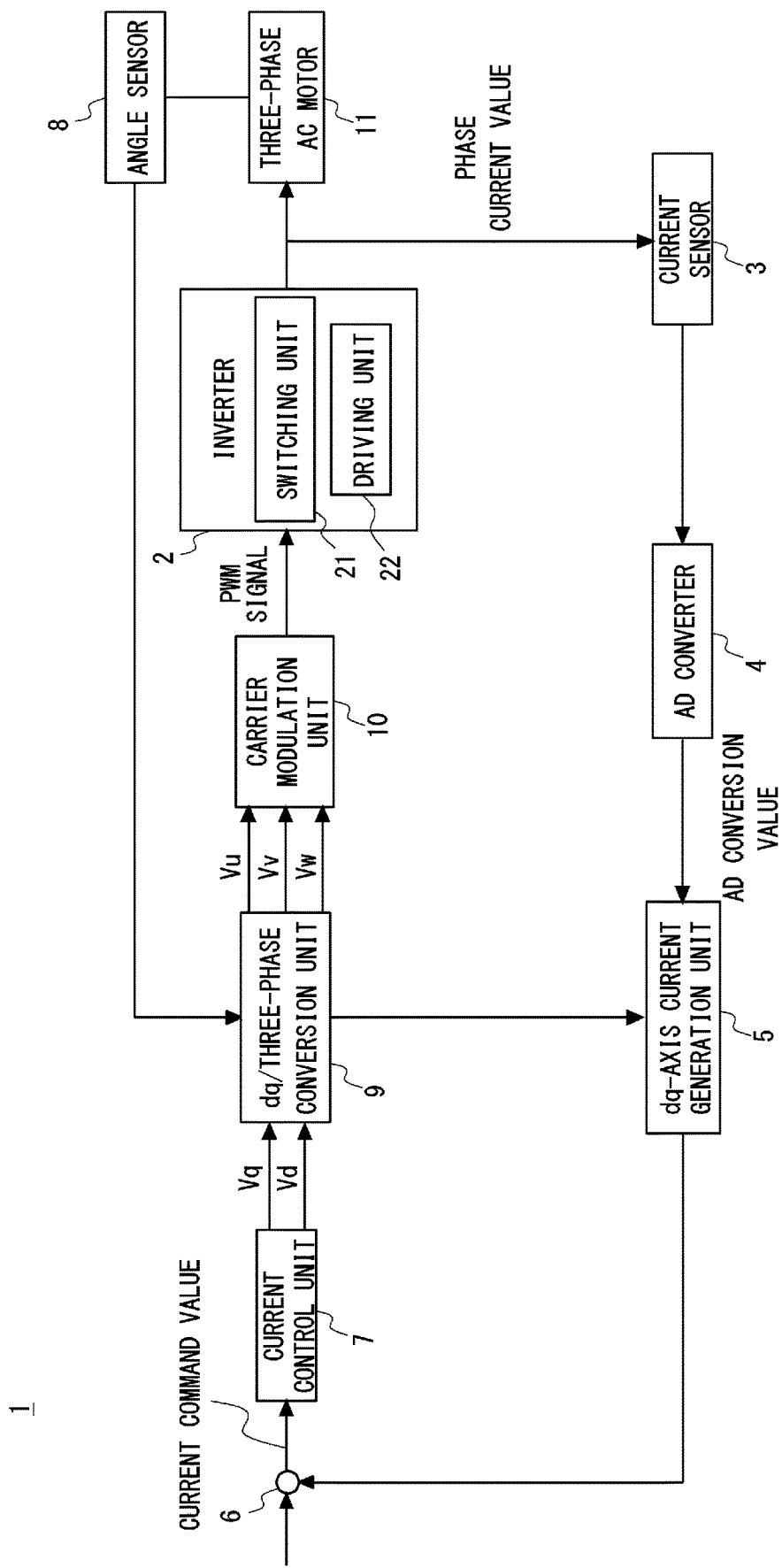
FIG. 1 is a block diagram showing a schematic system configuration of a motor control apparatus according to a first embodiment of the present disclosure.

Hereinafter, embodiments of the present disclosure will be described with reference to the drawings. FIG. 1 is a block diagram showing a schematic system configuration of a motor control apparatus according to a first embodiment of the present disclosure. A motor control apparatus 1 according to the first embodiment controls a three-phase AC motor 11. The three-phase AC motor 11 includes, for example, a rotor and a stator and is composed of a U-phase, a V-phase, and a W-phase.

The motor control apparatus 1 according to the first embodiment includes an inverter 2, a current sensor 3, an AD converter 4, a dq-axis current generation unit 5, a calculation unit 6, a current control unit 7, an angle sensor 8, a dq/three-phase conversion unit 9, and a carrier modulation unit 10.

Note that a main hardware configuration of the motor control apparatus 1 includes a microcomputer composed of, for example, a CPU (Central Processing Unit) that performs calculation processing, and control processing etc., a memory composed of a ROM (Read Only Memory) and a RAM (Random Access Memory) storing a calculation program and a control program etc. executed by the CPU, a control program, etc., an interface unit (I/F) that inputs and outputs signals to and from the outside. The CPU, the memory, and the interface unit are connected to one another through a data bus or the like.

The inverter 2 includes a switching unit 21 that performs power conversion and a driving unit 22 that drives the switching unit 21. The switching unit 21 includes, for example, a plurality of switching elements such as an IGBT (Insulated Gate Bipolar Transistor) and a MOSFET (metal-oxide-semiconductor field-effect transistor) and a shunt resistor.

The inverter 2 converts a DC current value into a three-phase AC current value by switching on and off the switching elements of the switching unit 21 according to a PWM signal from the carrier modulation unit 10. The inverter 2 outputs three phase current values converted into AC to the three-phase AC motor 11.

The current sensor 3 is a specific example of current detection means. The current sensor 3 detects a phase current value output from the inverter 2 to each phase of the three-phase AC motor 11. The current sensor 3 outputs the detected phase current value of each phase to the AD converter 4.

The AD converter 4 is a specific example of conversion means. The AD converter 4 acquires the analog phase current values from the current sensor 3, and converts the acquired phase current values into digital phase current values (hereinafter referred to as AD conversion values). The AD converter 4 outputs the converted AD conversion values of the respective phases to the dq-axis current generation unit 5.

The dq-axis current generation unit 5 calculates a dq-axis current value (d-axis and q-axis current values) of the three-phase AC motor 11 based on the AD conversion value of each phase from the AD converter 4 and a three-phase voltage command value from the dq/three-phase conversion unit 9. Here, as a coordinate system rotating in synchronization with rotation of the three-phase AC motor 11, a direction of a magnetic flux of a permanent magnet of the three-phase AC motor 11 is defined as a d-axis, and an axis orthogonal to the d-axis is defined as a q-axis. The dq-axis current generation unit 5 outputs the calculated dq-axis current value to the calculation unit 6.

The calculation unit 6 adds the dq-axis current value from the dq-axis current generation unit 5 and the dq-axis current command value (the d-axis and q-axis current command values) according to a motor torque command value to calculate a current command value. The calculation unit 6 outputs the calculated current command value to the current control unit 7.

The current control unit 7 is a specific example of current control means. The current control unit 7 performs a proportional integration control process or the like based on the current command value from the calculation unit 6 to calculate the dq-axis voltage command value (the d-axis and q-axis voltage command values). The current control unit 7 performs control in such a way that a stator current of the three-phase AC motor 11 follows the input current command value.

More specifically, the current control unit 7 first calculates a d-axis current deviation and a q-axis current deviation. The current control unit 7 calculates the d-axis current deviation and the q-axis current deviation by subtracting a dq-axis actual current from the dq-axis current command for each of the d-axis and q-axis, respectively. Then, the current control unit 7 performs a proportional integral control process to calculate a d-axis voltage command value Vq and a q-axis voltage command value Vd (hereinafter referred to as dq-axis voltage command values Vq and Vd) such that the d-axis current deviation and the q-axis current deviation become zero, respectively. The current control unit 7 outputs the calculated dq-axis voltage command values Vq and Vd to the qd/three-phase conversion unit 9.

The angle sensor 8 is provided in the three-phase AC motor 11 and detects a rotation angle of a rotor of the three-phase AC motor 11. The angle sensor 8 outputs the detected rotation angle to the dq/three-phase conversion unit 9.

The dq/three-phase conversion unit 9 calculates an electrical angle of the three-phase AC motor based on the rotation angle from the angle sensor 8. The dq/three-phase conversion unit 9 performs a coordinate conversion process and the like on the dq-axis voltage command values Vq and Vd calculated by the current control unit 7 based on the calculated electrical angle of the three-phase AC motor 11 to calculate a phase voltage command value. More specifically, the dq phase conversion unit 9 converts, based on the calculated electrical angle, the dq-axis voltage command values Vq and Vd into voltage command values corresponding to three phases of the three-phase AC motor 11, i.e., calculates phase voltage command values Vu, Vv, and Vw, which have been subjected to the coordinate conversion process into the U-phase voltage command value, V-phase voltage command value, and the W-phase voltage command value. The dq/three-phase conversion unit 9 outputs the calculated phase voltage command values Vu, Vv, and Vw to the carrier modulation unit 10.

The carrier modulation unit 10 generates a PWM counter value (a PWM carrier signal) using a timer operating at a predetermined cycle. The carrier modulation unit 10 compares the phase voltage command values Vu, Vv, Vw from the dq/three phase conversion unit 9 with the PWM counter value to generate a PWM (Pulse Width Modulation) signal. The carrier modulation unit 10 outputs the generated PWM signal to the inverter 2.

Incidentally, a noise (a switching noise) is generated in a phase current value of each phase detected by the current sensor at the timing when the switching element of the inverter is switched. At this timing, when the AD converter converts the phase current value of each phase detected by the current sensor into the digital AD conversion value, the switching noise is superimposed on the AD conversion value, which may adversely affect the motor control.

On the other hand, in the motor control apparatus 1 according to the first embodiment, when the AD converter 4 determines that an amplitude of the current command value is greater than or equal to a threshold, it acquires the phase current value of each phase from the current sensor 3 at the timings of $t=\tau/8$ and $3\tau/8$, converts the acquired phase current value of each phase into an AD conversion value, and outputs it. Further, when the AD converter 4 determines that the amplitude of the current command value is smaller than the threshold, it acquires the phase current value of each phase from the current sensor 3 at the timing of the time $t=\tau/2$, converts the acquired phase current value of each phase into the AD conversion value, and outputs it.

Thus, when the current command value is large, it is possible to shift the timing at which the switching element of the inverter 2 is switched from the timing at which the current sensor 3 acquires each phase current value and converts it into the AD conversion value. Therefore, even when the AD converter 4 converts the phase current value of each phase into the digital AD conversion value, the switching noise is not superimposed on the AD conversion value, thereby enabling excellent controllability to be maintained. That is, it is possible to prevent a switching noise from occurring and control the motor with high accuracy.

On the other hand, when the current command value is small, the timing at which the switching element of the inverter 2 is switched is distant from the timing at which the current sensor 3 acquires each phase current value and converts it into the AD conversion value. Thus, the AD converter 4 can acquire the phase current value from the current sensor 3 at the timing of the time $t=\tau/2$ without being affected by the switching noise and convert the acquired phase current value into the digital AD conversion value.

Figure 2:
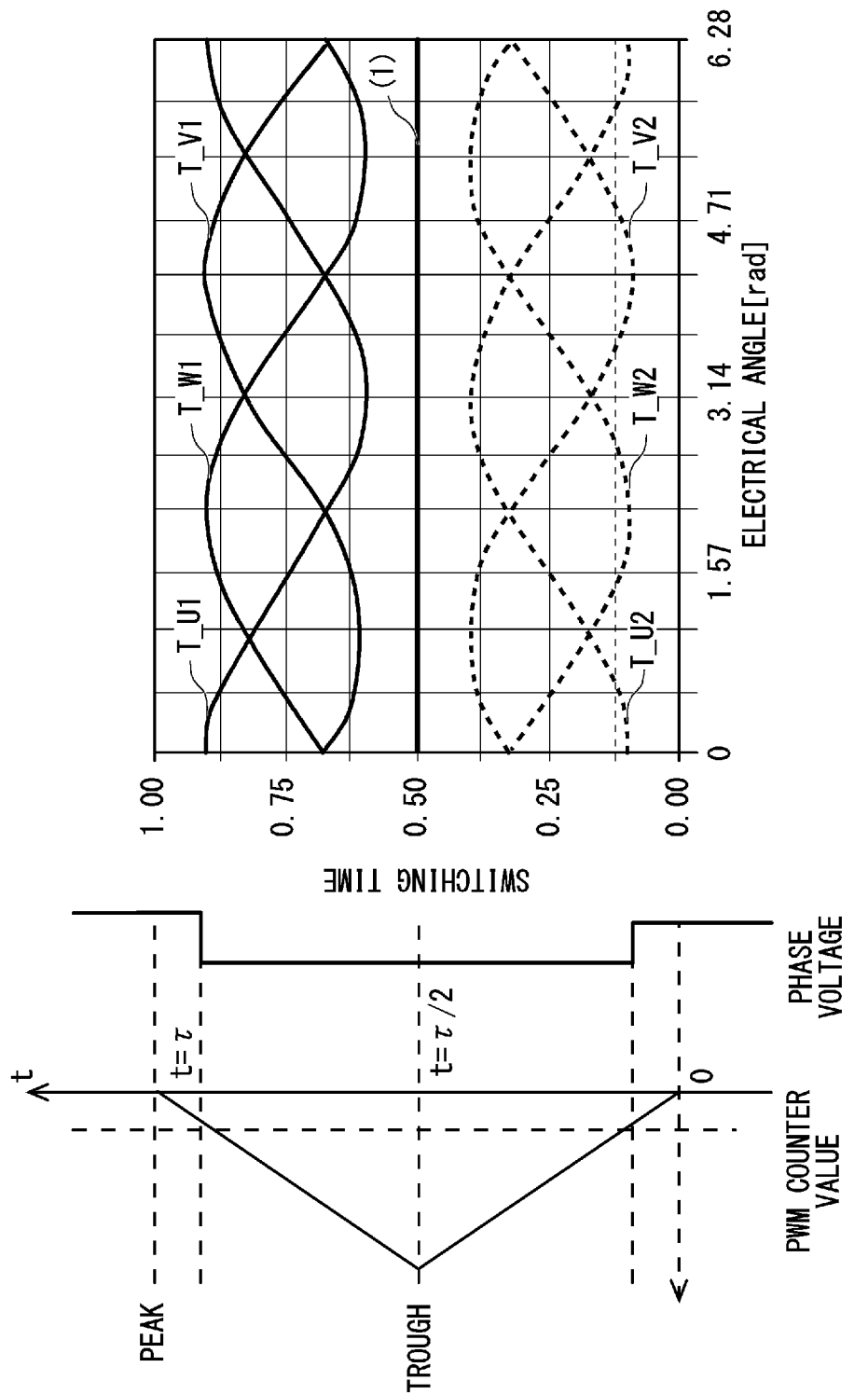
FIG. 2 is a diagram showing timings of switching of three phases when a current command value is small.

FIG. 2 is a diagram showing the timings of switching of the three phases when the current command value is small. In FIG. 2, the vertical axis represents time t, and one cycle of the PWM signal indicates $\tau$. The horizontal axis represents the electrical angle of the three-phase AC motor 11. The line (1) ($t=\tau/2$) indicates the timing at which the AD converter 4 acquires the phase current value from the current sensor 3.

When an amplitude A of the current command value is smaller than a threshold At, and the current command value is small, as shown in FIG. 2, the timing (the timing at which the three phases are switched) at which the switching element of the inverter 2 is switched is distant from the timing at which the current sensor 3 acquires each phase current value and converts it into the AD conversion value (the line (1)). At this timing, even when the AD converter 4 converts the phase current value of each phase into the digital AD conversion value, it is hard for the switching noise to be superimposed on the AD conversion value.

Therefore, when the AD converter 4 determines that the amplitude A of the current command value from the calculation unit 6 is smaller than the threshold At, it acquires the phase current value from the current sensor 3 at the timing of the time t=τ/2, and converts the acquired phase current value into the digital AD conversion value. The time t=τ/2 is a peak timing of the PWM counter value. The threshold At is stored in a memory or the like in advance.

Figure 3:
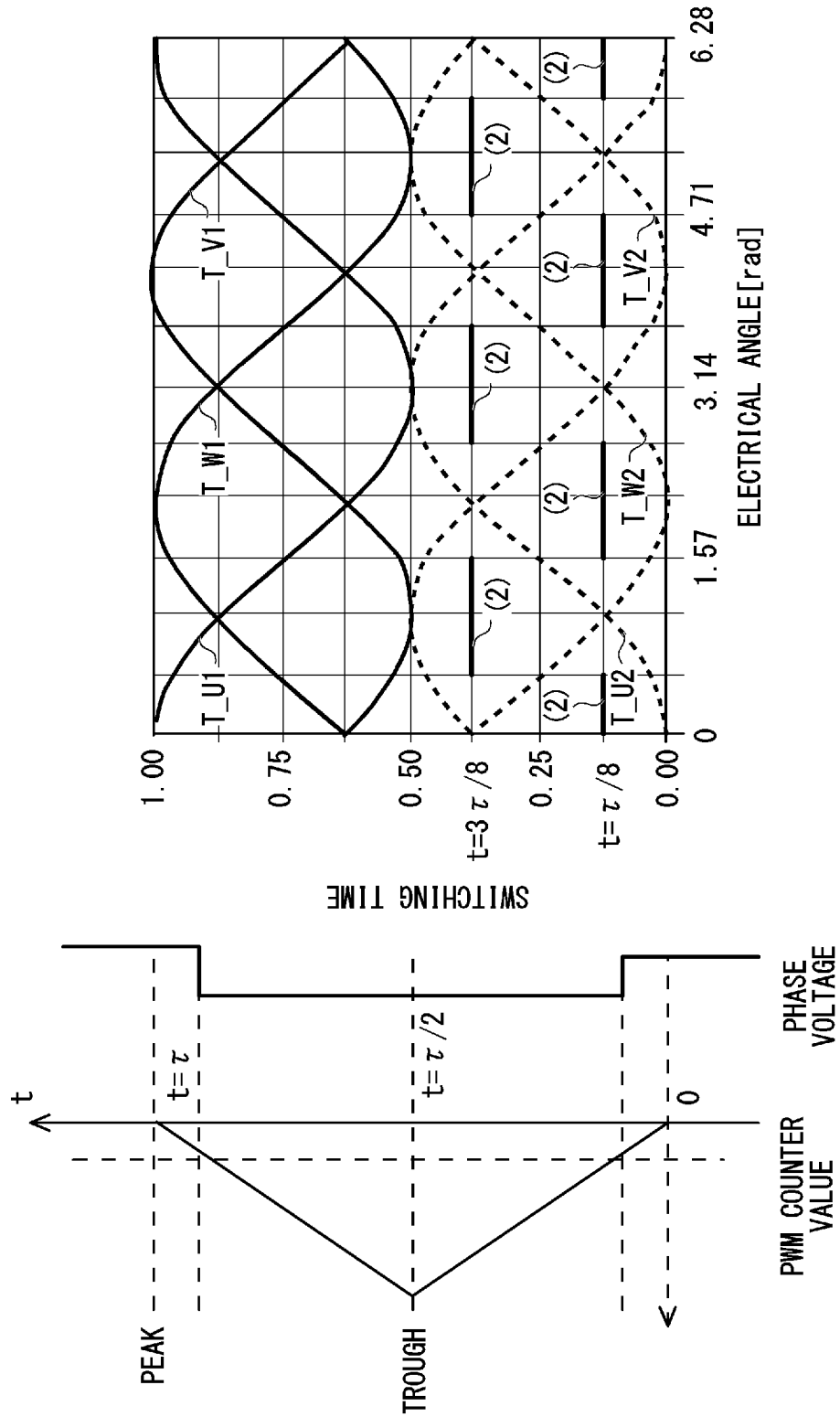
FIG. 3 is a diagram showing timings of switching of three phases the current command value is large.

FIG. 3 is a diagram showing the timing at which the three phases are switched when the current command value is large.

In FIG. 3, the vertical axis represents time t, and one cycle of the PWM signal indicates τ. The horizontal axis represents the electrical angle of the three-phase AC motor 11. The line (2) (times t=τ/8 and 3τ/8) indicates the timing at which the AD converter 4 acquires the phase current value from the current sensor 3.

When the amplitude A is greater than or equal to the threshold At of the current command value, and the current command value is large, as shown in FIG. 3, the timing at which the switching element of the inverter is switched overlaps the timing at which the current sensor detects each phase current (the timing of the time t=T/2). At this timing, when the AD converter converts the phase current value of each phase into the digital AD conversion value, the switching noise is superimposed on the AD conversion value, thereby deteriorating the controllability.

Therefore, in the first embodiment, when the AD converter 4 determines that the amplitude A of the current command value from the calculation unit 6 is greater than or equal to the threshold At, it acquires the analog phase current values from the current sensor 3 at the timings of the times t=τ/8 and 3τ/8 (the timings of the line (2)), and then converts them into the digital AD conversion values. The AD converter 4 outputs the converted AD conversion value to the dq/three-phase conversion unit 9.

Thus, when the current command value is large, it is possible to shift the timing at which the switching element of the inverter 2 is switched from the timing at which the current sensor 3 acquires each phase current value and converts it into the AD conversion value. Therefore, even when the AD converter 4 converts the phase current value of each phase into the digital AD conversion value, the switching noise is not superimposed on the AD conversion value, thereby effectively preventing the controllability from deteriorating.

As shown in FIG. 3, when the electrical angle θ of the three-phase AC motor 11 is (a) 0≤θ<π/6, 3π/6≤θ<5π/6, 7π/6≤θ<9π/6, or 11π/6≤θ<2π, the timing of the time t=τ/8 is distant from the timing at which the three phases are switched.

Thus, when the electrical angle θ of the three-phase AC motor 11 is (a) 0≤θ<π/6, 3π/6≤θ<5π/6, 7π/6≤θ<9π/6, or 11π/6≤θ<2π, the AD converter 4 converts the analog phase current value from the current sensor 3 is converted into the digital AD conversion value at the timing of the time t=τ/8. The AD converter 4 outputs the converted AD conversion value to the dq/three-phase conversion unit 9.

Further, as shown in FIG. 3, when the electrical angle θ of the three-phase AC motor 11 is (b) π/6≤θ<3π/6, 5π/6≤θ<7π/6, or 9π/6≤θ<11π/6, the timing of the time t=3τ/8 is distant from the timing of the switching of three phases.

Thus, when the electrical angle θ of the three-phase AC motor 11 is (b) π/6≤θ<3π/6, 5π/6≤θ<7π/6, or 9π/6≤θ<11π/6, the AD converter 4 converts the analog phase current value from the current sensor 3 into the digital AD conversion value at the timing of the time t=3π/8. The AD converter 4 outputs the converted AD conversion value to the dq/three-phase conversion unit 9.

Here, a method of setting the above-mentioned threshold At will be described.

Figure 4:
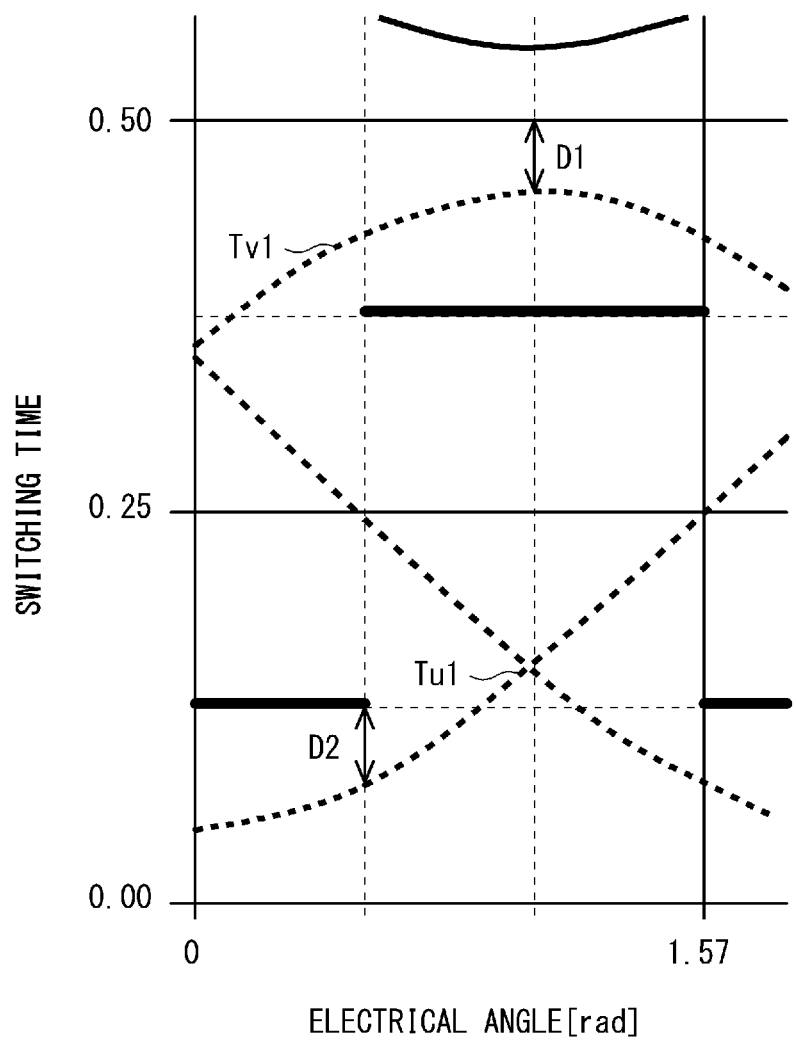
FIG. 4 is a diagram showing definitions of D1 and D2.

As shown in FIGS. 4, D1 and D2 are defined, and the threshold At is set. When the AD conversion is performed at the timing of the time t=π/2, the timing of the AD conversion approaches the timing at which the three phases are switched at the position of D1. Thus, the AD conversion value is most affected by the switching noise at the position of D1. On the other hand, when the AD conversion is performed at the timing of the time t=τ/8 or 3τ/8, the timing of the AD conversion approaches the timing at which the three phases are switched at the position of D2. Therefore, the AD conversion value is most affected by the switching noise at the position of D2. Thus, D1 and D2 are compared with each other in the manner described below.

In the case of D1≥D2, the analog phase current value from the current sensor 3 is converted into the digital AD conversion value at the timing of the time t=τ/2.

In the case of D1<D2, the time t=τ/8 or 3τ/8 is selected according to the electrical angle of the three-phase AC motor 11, and the analog phase current value from the current sensor 3 is converted into the digital AD conversion value at the selected timing.

Therefore, as shown in the following formula, an amplitude value satisfying D1=D2 is the threshold At.

[Formula 1]
$$V_V = \frac{1}{2}A\cos\left(\theta + \frac{2}{3}\pi\right) + \frac{1}{2}$$

$$T_{V1} = \frac{1}{2} - \frac{1}{2}V_V = \frac{1}{4} - \frac{1}{4}A\cos\left(\theta + \frac{2}{3}\pi\right)$$

$$D1 = \frac{1}{2} - T_{V1} = \frac{1}{2} - \left\{\frac{1}{4} - \frac{1}{4}A\cos\left(\frac{\pi}{3} + \frac{2}{3}\pi\right)\right\} = -\frac{1}{4}A + \frac{1}{4}$$

$$V_u = \frac{1}{2}A\cos\theta + \frac{1}{2}$$

$$T_{U1} = \frac{1}{2} - \frac{1}{2}V_V = \frac{1}{4} - \frac{1}{4}A\cos\theta$$

$$D2 = \frac{1}{8} - T_{U1} = \frac{1}{8} - \left\{\frac{1}{4} - \frac{1}{4}A\cos\frac{\pi}{6}\right\} = \frac{\sqrt{3}}{8}A - \frac{1}{8}$$

$$D1 = D2 とすると\quad -\frac{1}{4}A_t + \frac{1}{4} = \frac{\sqrt{3}}{8}A_t - \frac{1}{8}$$

$$A_t = 3(2 - \sqrt{3}) \approx 0.803848$$

When the AD converter 4 determines that the amplitude A of the current command value from the calculation unit 6 is greater than or equal to the threshold At, it acquires the analog phase current values from the current sensor 3 at the timings of the times t=τ/8 and 3τ/8 and converts them into the digital AD conversion values. However, the present disclosure is not limited to this.

When the AD converter 4 determines that the amplitude A of the current command value from the calculation unit 6 is greater than or equal to the threshold At, it may acquire the analog phase current value from the current sensor 3 at the timings of the times t=5τ/8 and 7τ/8 and convert them into the digital AD conversion values. Even in this case, like in the case of the timings of the times t=τ/8 and 3τ/8, when the current command value is large, it is possible to shift the timing at which the switching element of the inverter 2 is switched from the timing at which the current sensor 3 acquires each phase current value and converts it into the AD conversion value. Therefore, it is possible to prevent the switching noise from occurring and control the motor with high accuracy.

Figure 5:
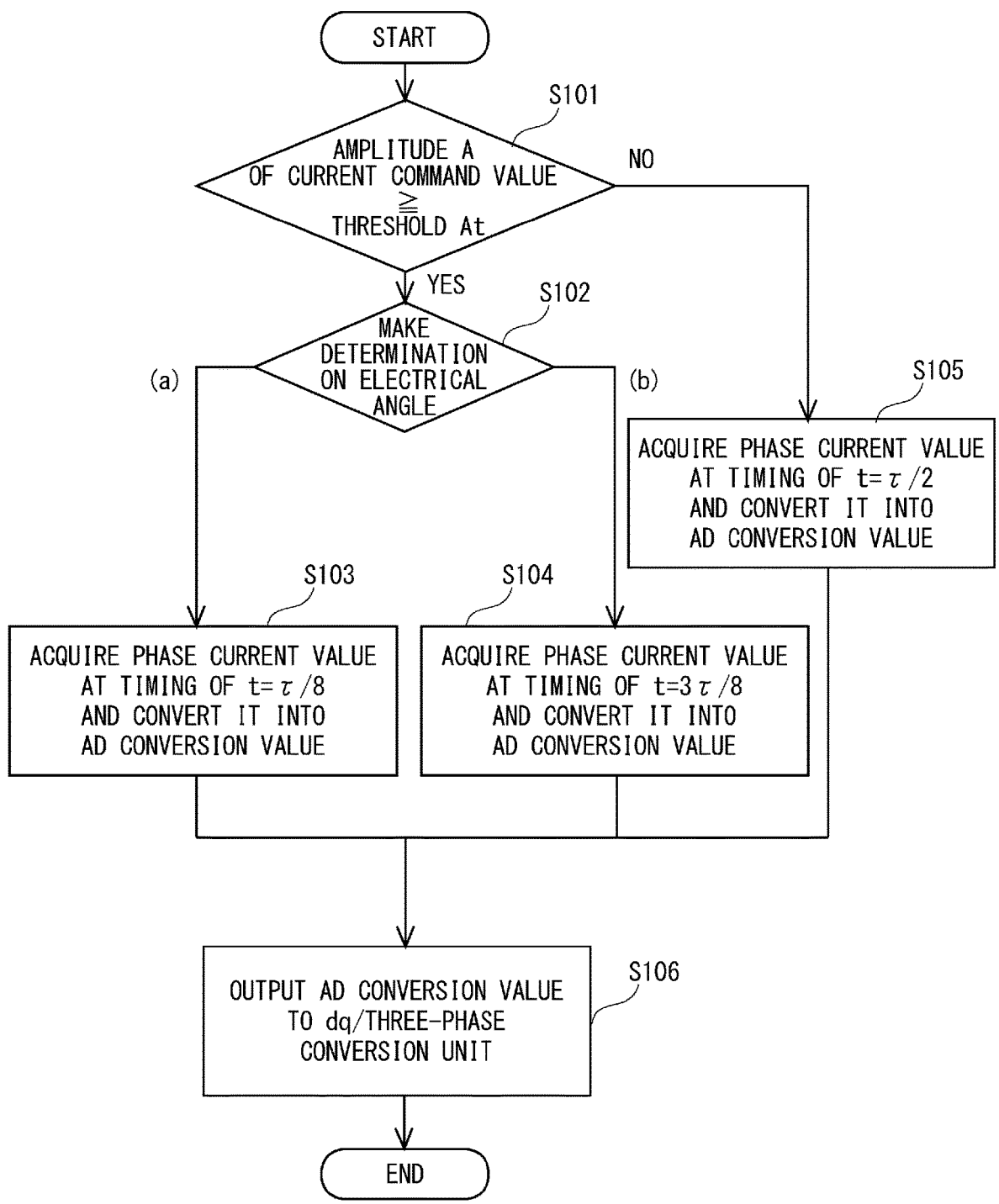
FIG. 5 is a flowchart showing a flow of a motor control method according to the first embodiment of the present disclosure.

FIG. 5 is a flowchart showing a flow of a motor control method according to the first embodiment.

The AD converter 4 determines whether the amplitude A of the current command value from the calculation unit 6 is greater than or equal to the threshold At (Step S101).

When the AD converter 4 determines that the amplitude A of the current command value from the calculation unit 6 is greater than or equal to the threshold At (YES in Step S101), it determines that the electrical angle of the three-phase AC motor 11 is one of (a) $0 \leq \theta < \pi/6$, $3\pi/6 \leq \theta < 5\pi/6$, $7\pi/6 \leq \theta < 9\pi/6$, or $11\pi/6 \leq \theta < 2\pi$, and (b) $\pi/6 \leq \theta < 3\pi/6$, $5\pi/6 \leq \theta < 7\pi/6$, or $9\pi/6 \leq \theta < 11\pi/6$ (Step S102).

When the AD converter 4 determines that the electrical angle of the three-phase AC motor 11 is (a) $0 \leq \theta < \pi/6$, $3\pi/6 \leq \theta < 5\pi/6$, $7\pi/6 \leq \theta < 9\pi/6$, or $11\pi/6 \leq \theta < 2\pi$, it acquires the phase current value from the current sensor 3 at the timing of the time $t=\tau/8$, and converts the acquired phase current value into the AD conversion value (Step S103).

On the other hand, when the AD converter 4 determines that the electrical angle of the three-phase AC motor 11 is (b) $\pi/6 \leq \theta < 3\pi/6$, $5\pi/6 \leq \theta < 7\pi/6$, or $9\pi/6 \leq \theta < 11\pi/6$, it acquires the phase current value from the current sensor 3 at the timing of the time $t=3\tau/8$, and converts the acquired phase current value into the AD conversion value (Step S104).

When the AD converter 4 determines that the amplitude A of the current command value from the calculation unit 6 is not greater than or equal to the threshold At (NO in Step S101), it acquires the phase current value from the current sensor 3 at the timing of the time $t=\tau/2$ and converts the acquired phase current value into the AD conversion value (Step S105).

The AD converter 4 outputs the converted AD conversion value to the dq/three-phase conversion unit 9 (Step S106).

As described above, in the first embodiment, when it is determined that the amplitude of the current command value is greater than or equal to the threshold, the phase current value of each phase is acquired from the current sensor 3 at the timings of the times $t=\tau/8$ and $3\tau/8$, the acquired phase current value of each phase is converted into the AD conversion value, and then output. While when it is determined that the amplitude of the current command value is smaller than the threshold, the phase current value of each phase is acquired from the current sensor 3 at the timing of the time $t=\tau/2$, the acquired phase current value of each phase is converted into the AD conversion value, and then output. By doing so, it is possible to prevent a switching noise from occurring and control the motor with high accuracy.

Second Embodiment

In the second embodiment of the present disclosure, when the AD converter 4 determines that the amplitude A of the current command value from the calculation unit 6 is greater than or equal to the threshold At, it acquires the phase current values from the current sensor 3 at the timings of the times $t=\tau/8$ and $3\tau/8$ in addition to the above timings of the times $t=5\tau/8$ and $7\tau/8$, and converts the acquired phase current values into the digital AD conversion values. As the AD conversion values are averaged by acquiring a plurality of phase current values, converting each of the acquired plurality of phase current values into the AD conversion values, and calculating an average value of the AD conversion value, AD conversion accuracy can be further improved.

Figure 6:
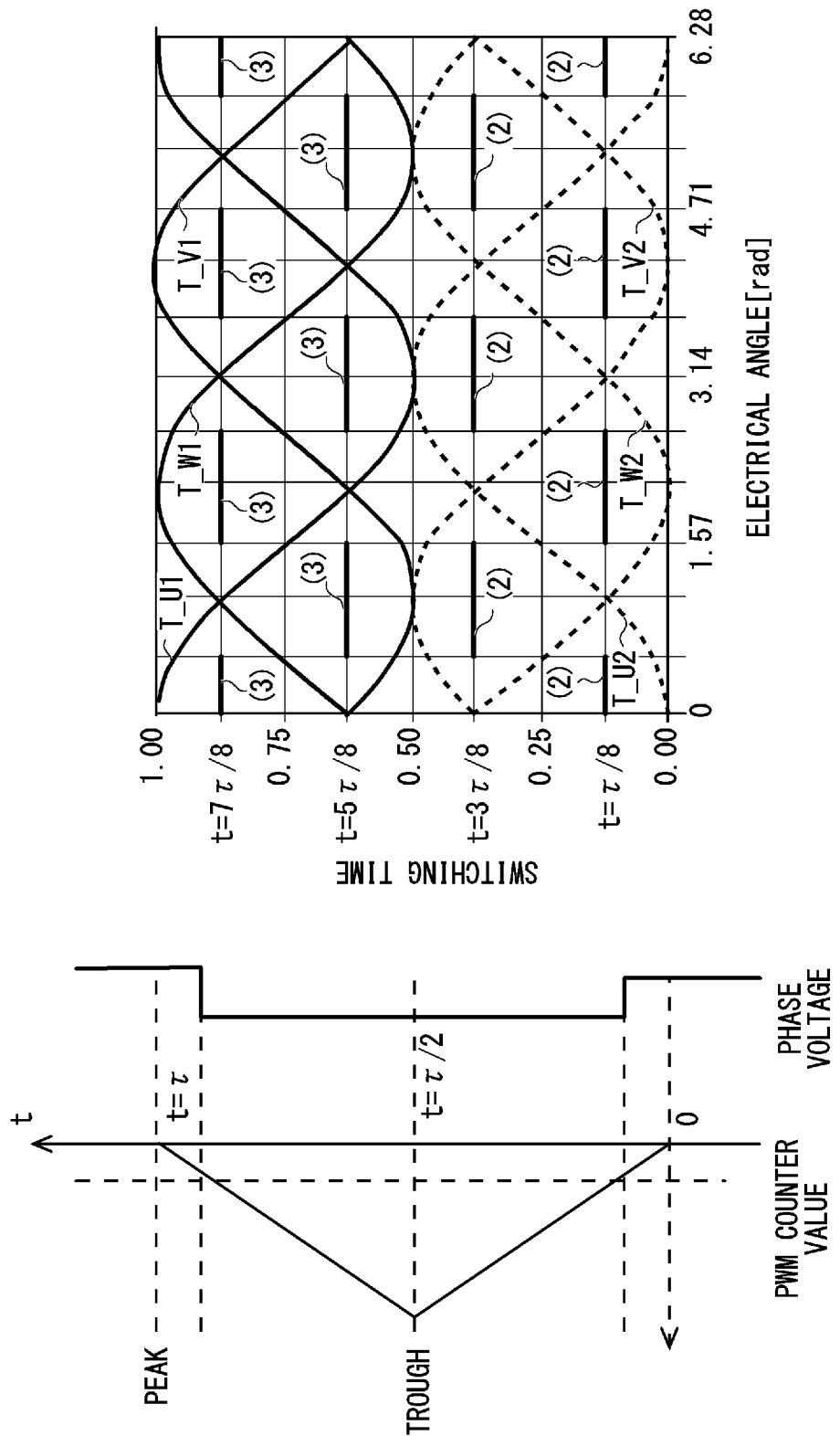
FIG. 6 is a diagram showing timings of switching of three phases when the current command value is large.

FIG. 6 is a diagram showing the timing at which the three phases are switched when the current command value is large.

In FIG. 6, the vertical axis represents time t, and one cycle of the PWM signal indicates τ. The horizontal axis represents the electrical angle of the three-phase AC motor 11. The line (3) (times $t=5\tau/8$ and $7\tau/8$) indicates the timing at which the AD converter 4 acquires the phase current from the current sensor 3.

As shown in FIG. 6, when the electrical angle θ of the three-phase AC motor 11 is (a) $0 \leq \theta < \pi/6$, $3\pi/6 \leq \theta < 5\pi/6$, $7\pi/6 \leq \theta < 9\pi/6$, or $11\pi/6 \leq \theta < 2\pi$, the timings of the times $t=\tau/8$ and $7\tau/8$ are distant from the timing at which the three phases are switched.

Thus, when the electrical angle θ of the three-phase AC motor 11 is (a) $0 \leq \theta < \pi/6$, $3\pi/6 \leq \theta < 5\pi/6$, $7\pi/6 \leq \theta < 9\pi/6$, or $11\pi/6 \leq \theta < 2\pi$, the AD converter 4 acquires the phase current values from the current sensor 3 at the timings of the times $t=\tau/8$ and $7\tau/8$, and converts the acquired phase current values into the digital AD conversion values.

The AD converter 4 calculates the average value of the AD conversion value at the timing of the time $t=\tau/8$ and the AD conversion value at the timing of the time $t=7\tau/8$, and outputs the average value of the calculated AD conversion values to the dq-axis current generation unit 5.

As shown in FIG. 6, when the electrical angle θ of the three-phase AC motor 11 is (b) $\pi/6 \leq \theta < 3\pi/6$, $5\pi/6 \leq \theta < 7\pi/6$, or $9\pi/6 \leq \theta < 11\pi/6$, the timings of the times $t=\pi/8$ and $5\pi/8$ are distant from the timing at which the three phases are switched.

Thus, when the electrical angle θ of the three-phase AC motor 11 is (b) $\pi/6 \leq \theta < 3\pi/6$, $5\pi/6 \leq \theta < 7\pi/6$, or $9\pi/6 \leq \theta < 11\pi/6$, the AD converter 4 acquires the phase current values from the current sensor 3 at the timings of the times $t=3\tau/8$ and $5\tau/8$, and converts the acquires phase current values into the digital AD conversion values.

The AD converter 4 calculates the average value of the AD conversion value at the timing of the time $t=3\tau/8$ and the AD conversion value at the timing of the time $t=5\tau/8$, and outputs the average value of the calculated AD conversion values to the dq-axis current generation unit 5.

Note that the AD converter 4 may calculate the average value of the phase current values detected by the current sensor 3 at the timings of the times $t=\tau/8$ and $7\tau/8$, and convert the average value of the calculated phase current values into the AD conversion value. Likewise, the AD converter 4 may calculate the average value of the phase current values detected by the current sensor 3 at the timings of the times $t=3\tau/8$ and $5\tau/8$, and calculate the average value of the calculated phase current values into the AD conversion value.

Figure 7:
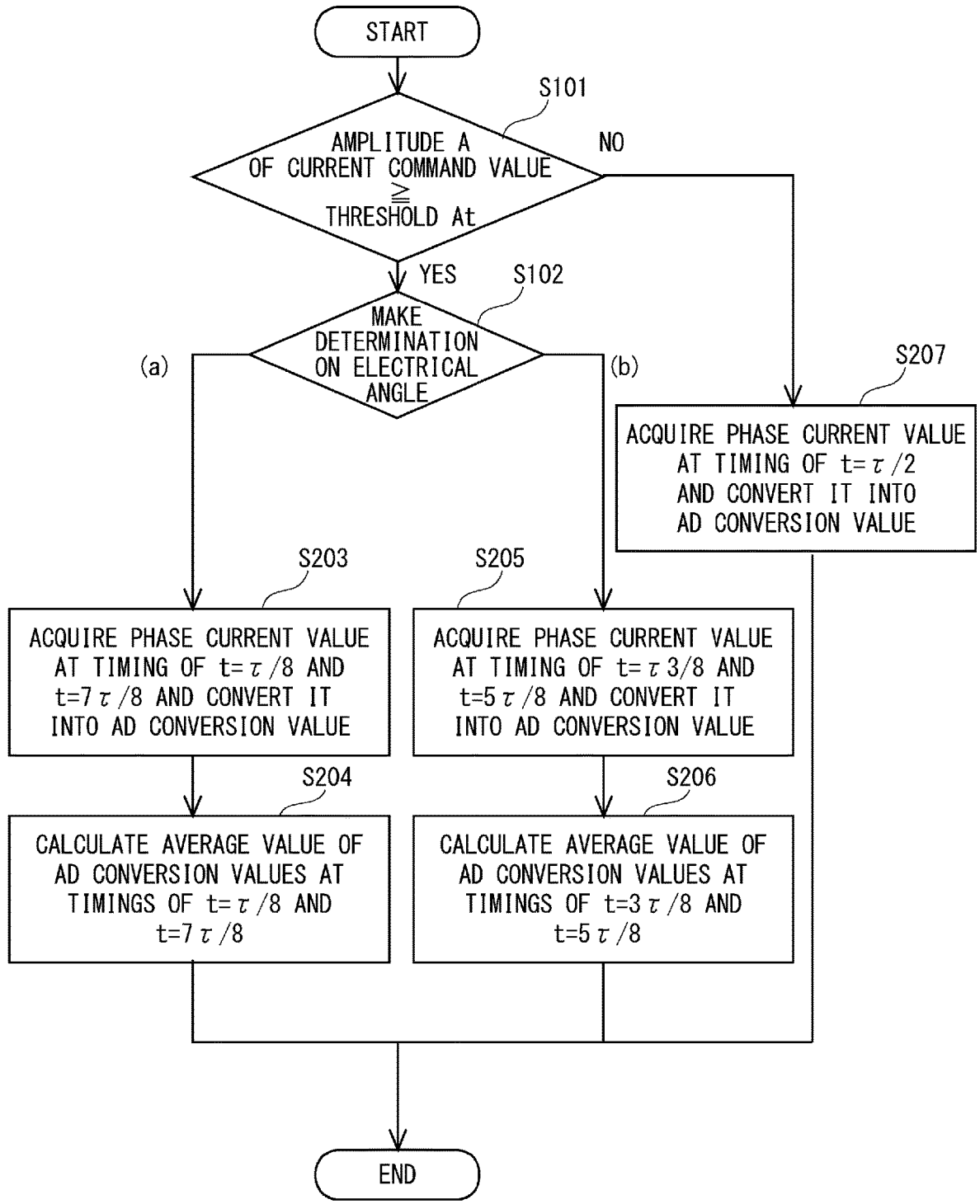
FIG. 7 is a flowchart showing a flow of a motor control method according to a second embodiment of the present disclosure.

FIG. 7 is a flowchart showing a flow of the motor control method according to the second embodiment.

The AD converter 4 determines whether the amplitude A of the current command value from the calculation unit 6 is greater than or equal to the threshold At (Step S201).

When the AD converter 4 determines that the amplitude A of the current command value from the calculation unit 6 is greater than or equal to the threshold At (YES in Step S201), the electrical angle of the three-phase AC motor 11 is one of (a) $0 \leq \theta < 6\pi$, $3\pi/6 \leq \theta < 5\pi/6$, $7\pi/6 \leq \theta < 9\pi/6$, or $11\pi/6 \leq \theta < 2\pi$ and (b) $\pi/6 \leq \theta < 3\pi/6$, $5\pi/6 \leq \theta < 7\pi/6$, or $9\pi/6 \leq \theta < 11\pi/6$ (Step S202).

When the AD converter 4 determines that the electrical angle of the three-phase AC motor 11 is (a) $0 \leq \theta < \pi/6$, $3\pi/6 \leq \theta < 5\pi/6$, $7\pi/6 \leq \theta < 9\pi/6$, or $11\pi/6 \leq \theta < 2\pi$, it acquires the phase current value from the current sensor 3 at the timings of the times t=τ/8 and 7τ/8, the acquired phase current value is converted into the AD conversion value (Step S203).

The AD converter 4 calculates the average value of the AD conversion value at the timing of the time t=τ/8 and the AD conversion value at the timing of the time t=7τ/8, and outputs the calculated average value of the AD conversion values to the dq-axis current generation unit 5 (Step S204).

On the other hand, when the AD converter 4 determines that the electrical angle of the three-phase AC motor 11 is (b) π/6≤θ<3π/6, 5π/6≤θ<7π/6, or 9π/6≤θ<11π/6, it acquires the phase current values from the current sensor 3 at the timings of the times t=3τ/8 and 5τ/8, and converts the acquired phase current values are converted into the AD conversion values (Step S205).

The AD converter 4 calculates the average value of the AD conversion value at the timing of the time t=3τ/8 and the AD conversion value at the timing of the time t=5τ/8, and outputs the calculated average value of the AD conversion values to the dq-axis current generation unit 5 (Step S206).

When the AD converter 4 determines that the amplitude A of the current command value from the calculation unit 6 is not greater than or equal to the threshold At (NO in Step S201), it acquires the phase current value from the current sensor 3 at the timing of the time t=τ/2, converts the acquired phase current value into the AD conversion value, and outputs the converted AD conversion value to the dq/three-phase conversion unit 9 (Step S207).

Third Embodiment

In the third embodiment, although the AD converter 4 converts the phase current values of the three phases into digital AD conversion values, the present disclosure is not limited to this. For example, when an inexpensive AD converter is used or a cycle of PWM is short, the conversion time of the AD converter is long, which makes it difficult for the phase current values of the three phases to be converted into the digital AD conversion values.

In such a case, the AD converter 4 may convert only the phase current values of the two phases into the digital AD conversion values. The AD converter 4 may calculate the AD conversion value of the remaining one phase by the following formula (sum of the current values of the three phases=0).

$$Iu+Iv+Iw=0$$

For example, the AD converter 4 converts the phase current values of the U-phase and V-phase into the digital AD conversion values and calculates the AD conversion value of the remaining W-phase by the above formula.

Further, as described in the above-described second embodiment, when the AD converter 4 performs the AD conversion at the timings of the times t=τ/8 and 3τ/8, and at the timings of the times t=5τ/8 and 7τ/8, it converts the phase current values of the U-phase and V-phase into digital AD conversion values at the timings of the times t=τ/8 and 7τ/8, respectively, and then calculates the AD conversion value of the remaining W-phase by the above formula.

According to the third embodiment, processing for two phases is sufficient for the AD conversion processing, and thus the processing load of the AD converter 4 can be reduced. Since an inexpensive AD converter can be used, the cost can be reduced.

Although some embodiments of the present disclosure have been described, these embodiments have been presented merely as examples and are not intended to limit the scope of the present disclosure. These novel embodiments can be implemented in various forms other than those described above. Various omissions, substitutions, and changes can be made without departing from the spirit of the present disclosure. These embodiments and modifications of the embodiments are included in the scope and the spirit of the present disclosure and included in the present disclosure described in claims and a scope of equivalents of the present disclosure.

The present disclosure can also be achieved, for example, by causing the CPU to execute a computer program that performs processes shown in FIGS. 5 and 7.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A motor control apparatus comprising:
an inverter comprising a plurality of switching elements configured to be switched on and off;
current detection means for detecting a phase current value output from the inverter to each phase of a three-phase AC motor;
conversion means for converting the phase current value detected by the current detection means into a digital AD conversion value; and
current control means for controlling the three-phase AC motor by switching the switching elements of the inverter using a current command value based on the AD conversion value converted by the conversion means, wherein
when the conversion means determines that an amplitude of the current command value is greater than or equal to a threshold, it acquires the phase current value from the current detection means at least one of at timings of t=τ/8 and 3τ/8 and at timings of t=5τ/8 and 7τ/8, where τ is one cycle of a PWM signal for controlling the switching elements of the inverter, converts the acquired phase current value into the AD conversion value, and then outputs it, and
when the conversion means determines that the amplitude of the current command value is smaller than the threshold, it acquires the phase current value from the current detection means at a timing of t=τ/2, converts the acquired phase current value into the AD conversion value, and then outputs it.

2. The motor control apparatus according to claim 1, wherein if the conversion means determines that the amplitude of the current command value is greater or equal to the threshold,
when an electrical angle θ of the three-phase AC motor is $0 \leq \theta < \pi/6$, $3\pi/6 \leq \theta < 5\pi/6$, $7\pi/6 \leq \theta < 9\pi/6$, or $11\pi/6 \leq \theta < 2\pi$, the conversion means acquires phase current values from the current detection means at timings of $t=\tau/8$ and $7\tau/8$, converts the acquired phase current values into AD conversion values, and then outputs them, and
when the electrical angle θ of the three-phase AC motor is $\pi/6 \leq \theta < 3\pi/6$, $5\pi/6 \leq \theta < 7\pi/6$, or $9\pi/6 \leq \theta < 11\pi/6$, the conversion means acquires a phase current value from the current detection means at timings of $t=3\tau/8$ and $5\tau/8$, converts the acquired phase current values into AD conversion values, and then outputs them.

3. The motor control apparatus according to claim 1, wherein
when the conversion means determines that the amplitude of the current command value is greater than or equal to the threshold, it acquires the phase current values from the current detection means at timings of $t=\tau/8$ and $3\tau/8$ and at timings of $t=5\tau/8$ and $7\tau/8$, and converts the acquired phase current values into AD conversion values,
the conversion means calculates an average value of the converted AD conversion value at the timing of $t=\tau/8$ and the converted AD conversion value at the timing of $t=7\tau/8$, and outputs the calculated average value of the AD conversion values, and
the conversion means calculates an average value of the converted AD conversion value at the timing of $t=3\tau/8$ and the converted AD conversion value at the timing of $t=5\tau/8$, and outputs the calculated average value of the AD conversion values.

4. The motor control apparatus according to claim 1, wherein the conversion means converts the phase current values of two phases among the phase current values of three phases from the current detection means into the AD conversion values, and calculates the AD conversion value of a remaining one phase based on a relational expression between the converted AD conversion values of the two phases and the phase current values of the three phases.

5. A method of controlling a motor control apparatus comprising:
an inverter comprising a plurality of switching elements configured to be switched on and off;
current detection means for detecting a phase current value output from the inverter to each phase of a three-phase AC motor;
conversion means for converting the phase current value detected by the current detection means into a digital AD conversion value; and
current control means for controlling the three-phase AC motor by switching the switching elements of the inverter using a current command value based on the AD conversion value converted by the conversion means, the method comprising;
when it is determined that an amplitude of the current command value is greater than or equal to a threshold, acquiring the phase current value from the current detection means at least one of at timings of $t=\tau/8$ and $3\tau/8$ and at timings of $t=5\tau/8$ and $7\tau/8$, where τ is one cycle of a PWM signal for controlling the switching elements of the inverter, converting the acquired phase current value into the AD conversion value, and then outputting it, and
when it is determined that the amplitude of the current command value is smaller than the threshold, acquiring the phase current value from the current detection means at a timing of $t=\tau/2$, converting the acquired phase current value into the AD conversion value, and then outputting it.

6. A non-transitory computer readable medium storing a program for a motor control apparatus comprising:
an inverter comprising a plurality of switching elements configured to be switched on and off;
current detection means for detecting a phase current value output from the inverter to each phase of a three-phase AC motor;
conversion means for converting the phase current value detected by the current detection means into a digital AD conversion value; and
current control means for controlling the three-phase AC motor by switching the switching elements of the inverter using a current command value based on the AD conversion value converted by the conversion means, the program causing a computer to execute;
when it is determined that an amplitude of the current command value is greater than or equal to a threshold, acquiring the phase current value from the current detection means at least one of at timings of $t=\tau/8$ and $3\tau/8$ and at timings of $t=5\tau/8$ and $7\tau/8$, where τ is one cycle of a PWM signal for controlling the switching elements of the inverter, converting the acquired phase current value into the AD conversion value, and then outputting it, and
when it is determined that the amplitude of the current command value is smaller than the threshold, acquiring the phase current value from the current detection means at a timing of $t=\tau/2$, converting the acquired phase current value into the AD conversion value, and then outputting it.

7. A motor control apparatus comprising:
an inverter comprising a plurality of switching elements configured to be switched on and off;
a current sensor configured to detect a phase current value output from the inverter to each phase of a three-phase AC motor;
a converter configured to convert the phase current value detected by the current sensor into a digital AD conversion value; and
a current controller configured to control the three-phase AC motor by switching the switching elements of the inverter using a current command value based on the AD conversion value converted by the converter, wherein
when the converter determines that an amplitude of the current command value is greater than or equal to a threshold, it acquires the phase current value from the current sensor at least one of at timings of $t=\tau/8$ and $3\tau/8$ and at timings of $t=5\tau/8$ and $7\tau/8$, where τ is one cycle of a PWM signal for controlling the switching elements of the inverter, converts the acquired phase current value into the AD conversion value, and then outputs it, and
when the converter determines that the amplitude of the current command value is smaller than the threshold, it acquires the phase current value from the current sensor at a timing of $t=\tau/2$, converts the acquired phase current value into the AD conversion value, and then outputs it.

* * * * *